United States Patent
Shi et al.

(10) Patent No.: US 10,819,244 B1
(45) Date of Patent: Oct. 27, 2020

(54) SINGLE-STAGE ISOLATED DC-DC CONVERTERS WITH INTERLEAVED ARMS

(71) Applicant: ABB POWER ELECTRONICS INC., Plano, TX (US)

(72) Inventors: Yuxiang Shi, Cary, NC (US); Liming Liu, Cary, NC (US); Jing Xu, Cary, NC (US)

(73) Assignee: ABB POWER ELECTRONICS INC., Plano, TX (US)

( * ) Notice: Subject to any disclaimer, the term of this patent is extended or adjusted under 35 U.S.C. 154(b) by 0 days.

(21) Appl. No.: 16/447,456

(22) Filed: Jun. 20, 2019

(51) Int. Cl.
*H02M 3/335* (2006.01)
*H02M 1/00* (2006.01)

(52) U.S. Cl.
CPC ............ *H02M 3/33569* (2013.01); *H02M 2001/0058* (2013.01)

(58) Field of Classification Search
CPC ............ H02M 3/33569; H02M 2001/0058
See application file for complete search history.

(56) References Cited

U.S. PATENT DOCUMENTS

| | | | |
|---|---|---|---|
| 7,782,639 B2 | 8/2010 | Vinciarelli | |
| 7,872,886 B2 | 1/2011 | Xu et al. | |
| 9,509,225 B2 | 11/2016 | Stephens et al. | |
| 9,831,787 B1 | 11/2017 | Halberstadt et al. | |
| 9,893,633 B1* | 2/2018 | Li | H02M 3/33546 |
| 9,998,018 B2 | 6/2018 | Fu et al. | |
| 2014/0268908 A1 | 9/2014 | Zhou et al. | |
| 2018/0034359 A1* | 2/2018 | Chen | H02M 1/083 |
| 2018/0309373 A1* | 10/2018 | Chang | H02M 3/33523 |

OTHER PUBLICATIONS

X. Sun, J. Qiu, X. Li, B. Wang, L. Wang, and X. Li, "An Improved Wide Input Voltage Buck-Boost + LLC Cascaded Converter", IEEE Energy Conv. Congress and Expo., Sep. 2015, pp. 1473-1478.

* cited by examiner

*Primary Examiner* — Fred E Finch, III
*Assistant Examiner* — Rafael O De Leon Domenech
(74) *Attorney, Agent, or Firm* — Barnes & Thornburg LLP

(57) ABSTRACT

According to one aspect of the present disclosure, a single-stage converter includes a rectifying circuit and a buck-boost circuit. The buck-boost circuit includes an inductor with a center tap configured to supply an output of the buck-boost circuit to the rectifying circuit. The buck-boost circuit also includes first and second interleaved arms arranged in parallel with a voltage input of the single-stage converter. The first and second interleaved arms are each coupled to the inductor and include a plurality of switches operable to control the output of the buck-boost circuit.

13 Claims, 9 Drawing Sheets

US 10,819,244 B1

SINGLE-STAGE ISOLATED DC-DC CONVERTERS WITH INTERLEAVED ARMS

TECHNICAL FIELD

The present disclosure relates to power conversion and, more particularly, to single-stage isolated DC-DC converters.

BACKGROUND

Often times, electronics and other applications call for power characteristics that are different from available power sources. Converters, transformers, and/or combinations thereof address the problem of mismatched power sources and power needs. Converters include electronic circuits and electromechanical devices that convert a source of direct current (DC) from one voltage level to another. A transformer is conventionally utilized to increase or decrease the alternating voltages in electric power applications. However, power conversion may be costly, in terms of component size, expense, noise introduction, power consumption, thermal load, etc. Converters situated proximate an electronics application, so-called point of load (POL) converters, are perhaps even more susceptible to these challenges. Further, increasingly wide input and/or output operational ranges are called for by applications more and more frequently. Also, particularly for POL applications, increased power density is desirable. As such, single-stage converters with wide gain range and efficient control, such as those disclosed below, represent an improvement in the art.

The description provided in this background section should not be assumed to be prior art merely because it is mentioned in or associated with the background. The background section may include information that describes one or more aspects of the subject technology.

SUMMARY

According to one aspect of the present disclosure, a single-stage converter includes a rectifying circuit and a buck-boost circuit. The buck-boost circuit includes an inductor with a center tap configured to supply an output of the buck-boost circuit to the rectifying circuit. The buck-boost circuit also includes first and second interleaved arms arranged in parallel with a voltage input of the single-stage converter. The first and second interleaved arms are each coupled to the inductor and include a plurality of switches operable to control the output of the buck-boost circuit.

According to another aspect of the present disclosure, a power circuit includes a rectifier having a tank resonator, a transformer, and at least one active component. In accordance with this aspect, the power circuit also includes a buck-boost circuit having an inductor operable to generate an AC output to the rectifier, and interleaved arms coupled to the inductor such that the interleaved arms include a plurality of switches operable to control power supplied to the inductor.

Yet another aspect of the instant disclosure describes a method of operating a converter including operating a plurality of switches disposed in first and second interleaved arms of the converter to generate an AC voltage in an inductor of the converter that is coupled to the first and second interleaved arms, and rectifying the AC voltage with an LLC resonant circuit of the converter and at least one diode of the converter.

Other aspects and advantages of the present disclosure will become apparent upon consideration of the following detailed description and the attached drawings wherein like numerals designate like structures throughout the specification.

BRIEF DESCRIPTION OF THE DRAWINGS

The detailed description below refers to the appended drawings, in which.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject matter disclosed.

DETAILED DESCRIPTION OF THE DRAWINGS

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, modules and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

Conventionally, two-stage solutions including a non-isolated buck-type or boost-type converter and an LLC DC transformer have been widely adopted for POL and similar applications in order to facilitate increased step-up/step-down conversion and relatively wide voltage gain ranges. However, conventional two-stage solutions require complex circuitry. This increased circuit complexity results in practical limitations on power density, efficiency, and expense. With reference to FIGS. 1-8, a single-stage converter 100 embodied as an integrated buck-boost LLC converter comprising a buck-boost circuit 102 and a rectifier circuit 104 (including, for example, resonant tank(s), LLC resonant circuit, LC circuit, CLLC circuit, rectifying diode(s), synchronous rectifier(s), and/or other suitable electrical components) is shown and described. The single-stage isolated DC-DC converter 100 features increased efficiency, greater power density, and wide-range voltage gain. An extended operational range of the single-stage converter 100 facilitates use of the single-stage converter 100 for DC-DC power conversion requiring high power density and wide-ranging voltage conversion ratios. For example, the single-stage converter 100 is desirable for electric vehicle charging, POL power supplies, and other similar applications. The buck-boost circuit 102 comprises a multiplexing switching cell (MSC) 106 that provides soft switching. Additionally, in an example embodiment, the single-stage converter 100 integrates all or most of the magnetic components disposed therein. Integration of the magnetic components may result in reduced transformer and/or inductor size for the single-stage converter 100. However, unsymmetrical current stress may be applied across the MSC 106.

Figure 1:
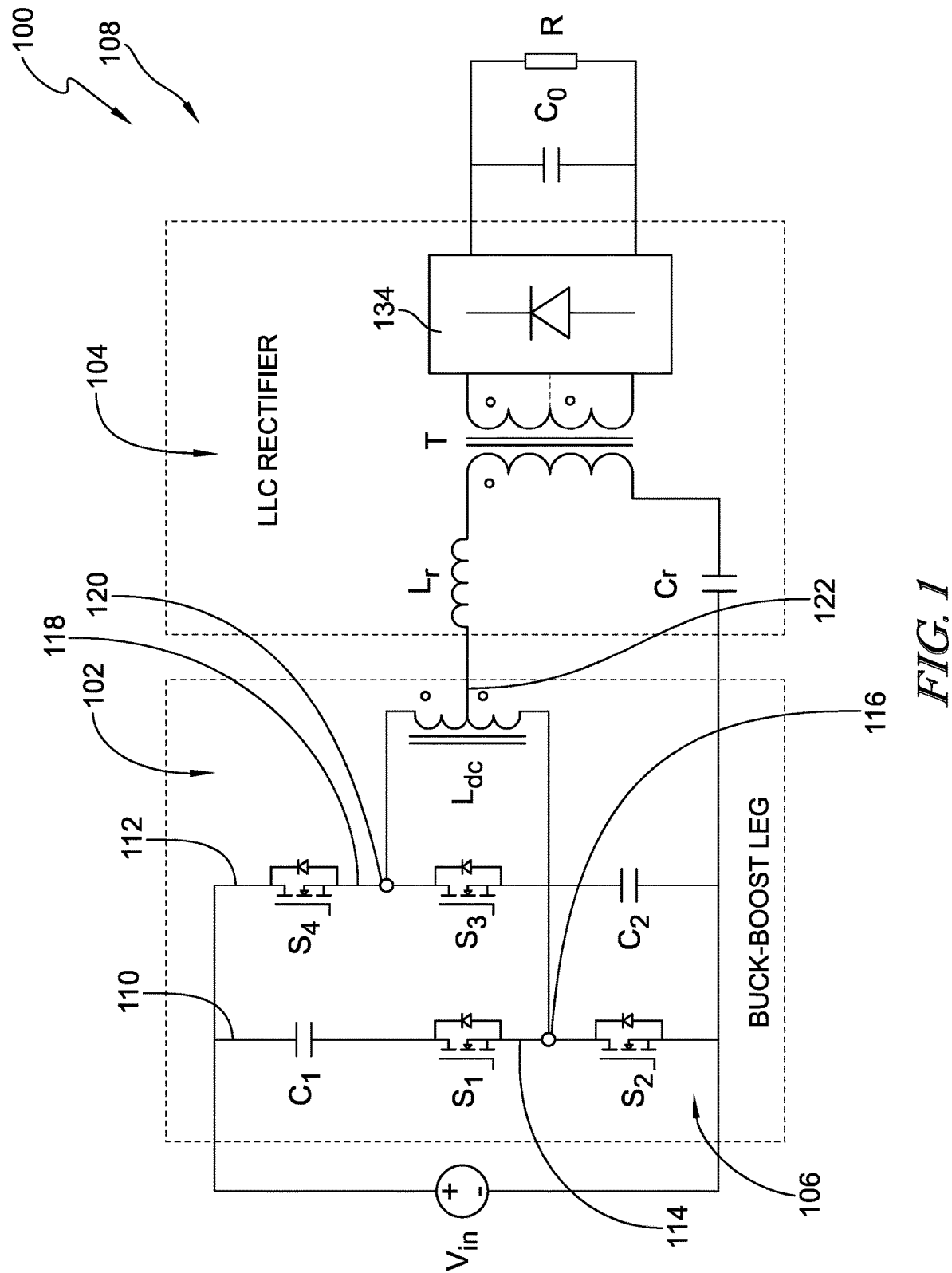
FIG. 1 is a schematic circuit diagram illustrating a single-stage converter capable of developing a wide gain range.

One illustrative embodiment of the single-stage converter 100 and basic operational principles thereof are shown in FIGS. 1 and 2-6, respectively. Specifically, the example single-stage converter 100 diagrammed in FIG. 1 is a half-bridge LLC converter configuration 108 (see also FIG. 8). Referring now to FIG. 1, first and second arms 110, 112 of the buck-boost circuit 102 are connected to a voltage input $V_{in}$. The first arm 110 comprises a first capacitor C1 and a first half-bridge 114. The first half-bridge 114 further comprises first and second complementary switches S1, S2 disposed about a first node 116. The first capacitor C1 is arranged in series with the first switch S1 of the first half-bridge 114.

The second arm 112 comprises a second capacitor C2 and a second half-bridge 118. The second half-bridge 118 comprises third and fourth complementary switches S3 and S4 disposed about a second node 120. The second capacitor C2 is arranged in series with the third switch S3 of the second half-bridge 118. In this example embodiment, the first and second arms 110, 112 are interleaved (i.e., phase shifted by 180°). The first and third switches S1, S3 may operate according to a duty cycle D (see FIGS. 2-6). Further, the first and second half-bridges 114, 118 are coupled to a DC inductor $L_{dc}$ via the first and second nodes 116, 120 of said respective first and second half-bridges 114, 118. It is contemplated that switches, including the first through fourth switches S1-S4 may include one or more diodes and or other active electronic/semiconductor components. In example embodiments, ultra-fast devices, such as silicon carbide (SiC) and/or gallium nitride (GaN) diodes, may be used as the switches S1-S4 disposed within the buck-boost circuit 102.

The DC inductor $L_{dc}$ comprises a center tap 122 generating a single AC output of the buck-boost circuit 102. In this example configuration, a common mode output voltage 124 (see FIGS. 5 and 6) of the first and second arms 110, 112 develops an AC output voltage, and a differential mode output voltage 126 (see FIGS. 3 and 4) of the two arms 110, 112 develops pulse voltages across the DC inductor $L_{dc}$. According to this configuration, the non-inverting buck-boost-type converter 102 is integrated between the first and second arms 110, 112. The buck-boost circuit 102 develops a switched-mode power supply across the inductor $L_{dc}$. Therefore, the inductor $L_{dc}$ operates according to the volt-second balancing of magnetic components. The relationship between voltage and the duty cycle D across the inductor $L_{dc}$ is:

$$V_{in}+V_c=0.5*V_{in}/D$$

The interleaved first and second arms 110, 112 may then be used as a phase leg to construct half-bridge, single-phase, and/or multi-phase LLC converters. As noted above, the example embodiment diagrammed in FIG. 1 is the half-bridge LLC converter configuration 108. A current within each of the first and second half-bridges 114, 118 is unsymmetrical. As a result, each of the first and third switches S1, S3, respectively in series with the first and second capacitors C1, C2, carries only AC current. As a result, an AC output voltage of the buck-boost circuit 102 is symmetrical.

Referring still to FIG. 1, the buck/boost circuit 102 is operatively coupled with the rectifier circuit 104. The rectifier circuit 104 is configured between the center tap 122 of the DC inductor $L_{dc}$ and the voltage input $V_{in}$. The rectifier circuit 104 may be an LLC resonant converter/tank resonator comprising a resonant inductor $L_r$ and a resonant capacitor $C_r$ disposed on either side of a transformer T. The resonant inductor $L_r$ is operatively coupled to the center tap 122 and receives, as the input thereto, the AC output of the buck/boost circuit 102. The resonant capacitor $C_r$ is operatively coupled to the voltage input $V_{in}$. One or more rectifying diodes 134 may be operatively coupled between the transformer T and an output capacitor Co, and/or a resistive load R, and/or another suitable load. The present disclosure contemplates a rectifying power supply topology comprising at least one diode and one capacitor. In the example shown in FIG. 1, a single rectifying diode 134a rectifies one half cycle of the AC signal. Also, in example embodiments, one or more synchronous rectifiers, which may include active electrical components such as one or more metal oxide semiconductor field-effect transistor(s) (MOSFETs), bipolar junction transistor(s) (BJTs), and/or other suitable transistor(s), may be combined with or substituted for the one or more rectifying diodes 134. As a result, the output capacitor $C_o$ may be relatively large to suitably filter and/or compensate the output DC signal and desirably prevent ripple in the output voltage. In example embodiments, switching devices (e.g., mechanical switches, high-speed switches, other suitable active component switches, etc.) may replace the one or more diodes 134 in the rectifier circuit 104.

Referring now to FIGS. 2-6, operation of the single-stage converter 100 facilitates increased voltage gain and straight-forward control. The single-stage converter 100 may be operated according to a pulse width modulation (PWM) mode, a pulse frequency modulation (PFM) mode, and/or a hybrid mode combining PWM and PFM control schemes. The voltage gain may be regulated by modification of the duty cycle D. In the example embodiment of FIG. 1, the AC voltage applied to the rectifier circuit 104 is:

$$0.5*(Vin+Vc)=0.25*Vin/D$$

In an example with the duty cycle D selected as a 50% duty cycle, the single-stage converter 100 develops unit voltage gain similar to a conventional half-bridge LLC circuit. However, when an example embodiment operates with the duty cycle D set at other than 0.5 (i.e., other than 50%), then the AC voltage across the rectifier circuit 104 develops a gain of 0.5/D. For example, when the duty cycle D changes between 0.25 and 0.75, the integrated buck-boost LLC converter 100 provides voltage gain between 2 and ⅔, at the respective duty cycles D. Additionally, further voltage gain may be obtained by regulating switching frequency. If the single-stage converter 100 develops additional voltage gain by a factor of 1 to 2 through PFM, then the cumulative voltage gain may range from about ⅔ to about 4. Therefore, this example represents a voltage gain range of about 6 or greater. Such a relatively wide gain is desirable for any number of modern applications discussed in the examples throughout this disclosure. Further, duty cycle changes and switching frequency control may be optimized to ensure smooth transition between switching states.

Figure 2:
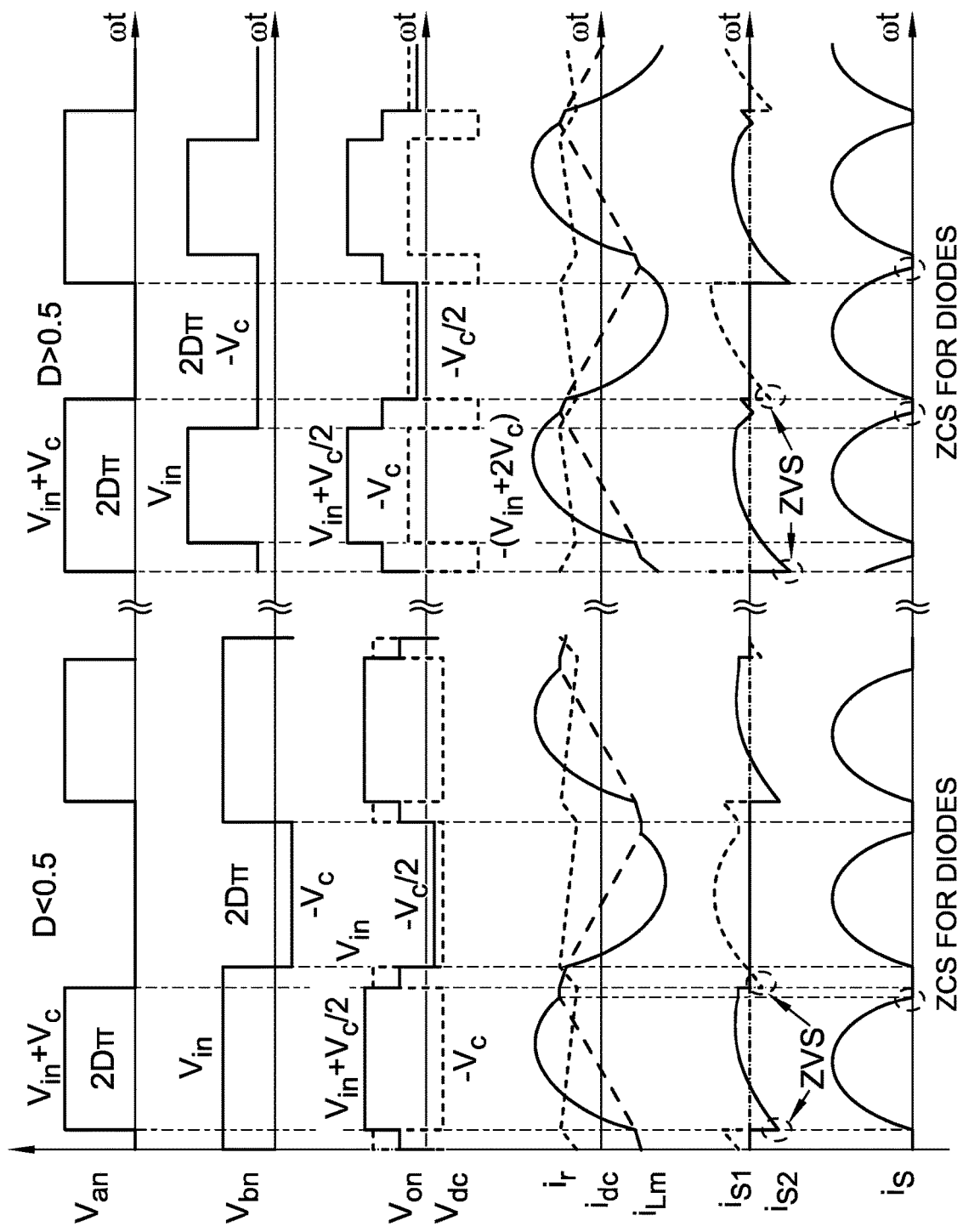
FIG. 2 is a chart representing operational modes and switching patterns of the single-stage converter of FIG. 1 and output voltages resulting therefrom.

Moreover, the single-stage converter 100 may operate according to zero-voltage turning-on (ZVS) for all the primary switching devices (e.g., first through fourth switches S1-S4) and zero-current turning-off (ZCS) for all the secondary devices (e.g., the one or more diodes 134) within the full operational range, as shown in FIG. 2. This results in lower voltage device ratings compared to conventional two-stage solutions. Additionally, the single-stage converter 100 develops symmetrical AC voltage as compared with conventional buck-boost and LLC resonator cascaded converters.

Referring once again to FIG. 2, ZVS switching points for the first and second switches S1, S2 are indicated. Further, ZCS switching points for the one or more rectifying diodes 134 are also illustrated in FIG. 2. Here, the ZVS and ZCS switching points are indicated when the duty cycle D is below 50% and when the duty cycle D is above 50%. Additionally, single-stage integration of the buck-boost circuit 102 with the rectifier circuit 104 according to differential-mode and common-mode voltage gain outputs is facilitated by the interleaved arms 110, 112 and switching arrangement thereof.

Figure 3:
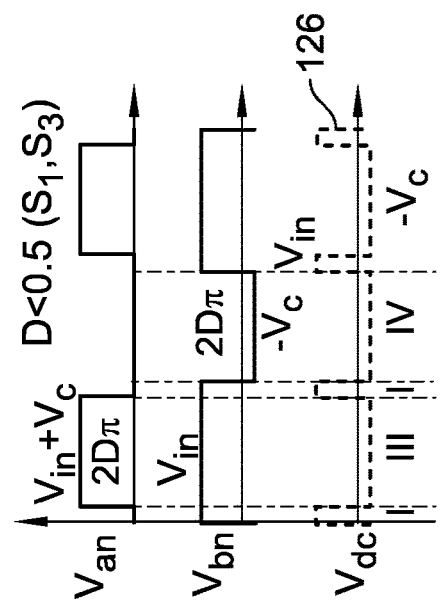
FIG. 3 is a chart representing a differential mode output for a duty cycle of less than 50% and circuit diagrams representing varying outputs of the differential mode.
Figure 3:
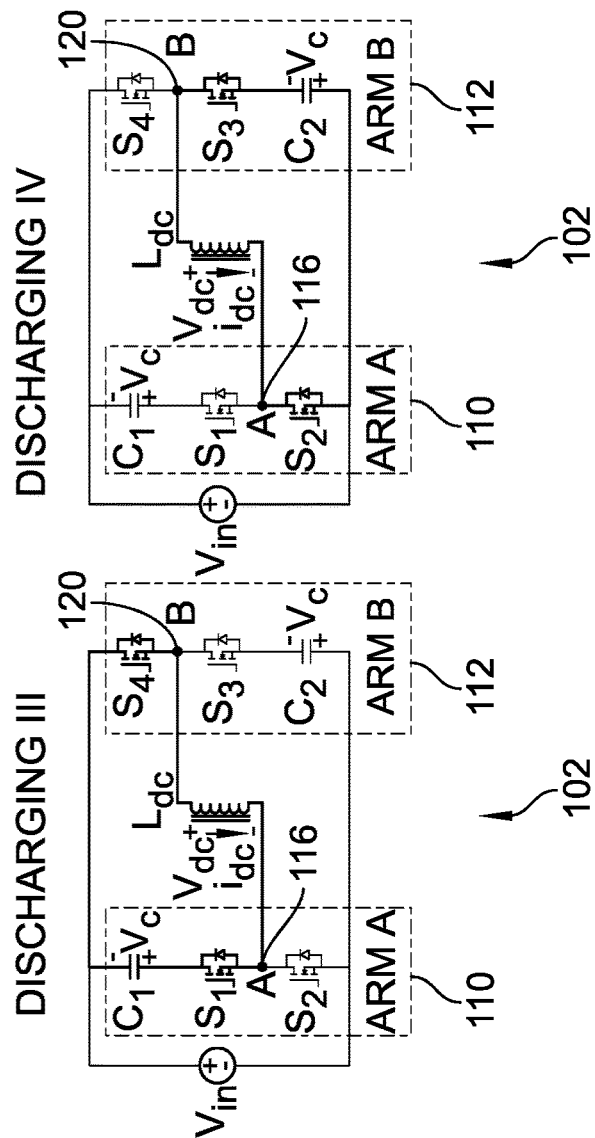
Figure 3:
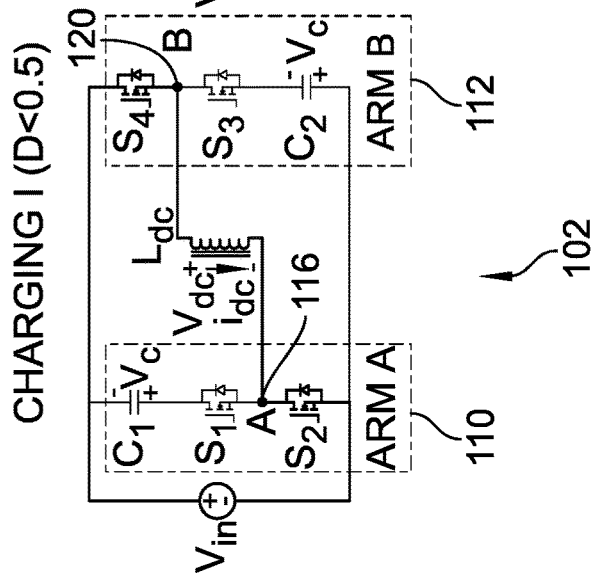
Figure 4:
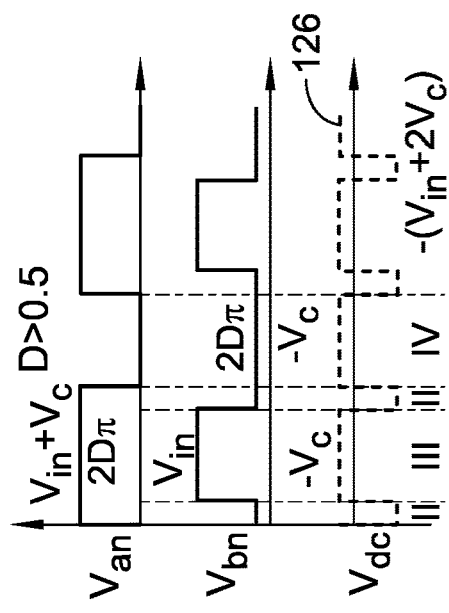
FIG. 4 is a chart representing a differential mode output for a duty cycle of greater than 50% and circuit diagrams representing varying outputs of the differential mode.
Figure 4:
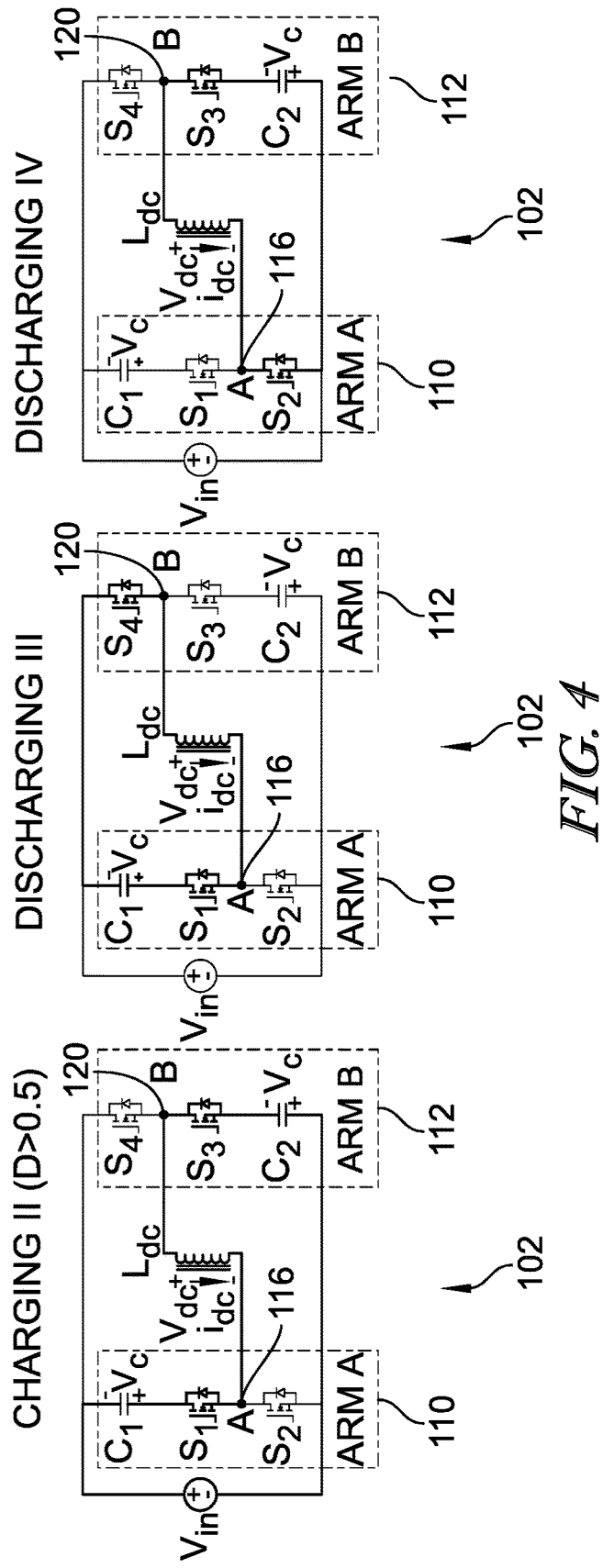

FIGS. 3 and 4 illustrate integration of the buck-boost circuit 102 by the interleaved arms 110, 112 according to a differential-mode gain of the converter 100 (i.e., differences between the voltages in the first and second arms 110, 112 are amplified). In FIG. 3, voltages through the first and second arms 110, 112 of the single-stage converter 100 are shown when the duty cycle D is less than 50%. When the duty cycle D is lower than 50%, the inductor $L_{dc}$ is charged through the second switch S1 of the first arm 110 and the fourth switch S4 of the second arm 112. FIG. 4 depicts voltages through the first and second arms 110, 112 when the duty cycle D is greater than 50%. Accordingly, the inductor $L_{dc}$ is charged through the first capacitor C1 and the first switch S1 of the first arm 110 in connection with the second capacitor C2 and the third switch S3 of the second arm 112 when the duty cycle is greater than 50%.

The inductor $L_{dc}$ is discharged according to the same topologies whether the duty cycle D is less or greater than 50%. Particularly, the inductor $L_{dc}$ is discharged through the first capacitor C1 and the first switch S1 from the first arm 110 in connection with the fourth switch S4 from the second arm 112. Also, the inductor $L_{dc}$ is discharged by the second switch S2 of the first arm 110 in connection with the second capacitor C2 and the third switch S3 of the second arm 112.

The voltage diagrams of FIGS. 3 and 4 indicate charging and discharging states during the progression of the duty cycle D. In FIG. 3, stage I indicates charging while stages III and IV indicate discharging. However, FIG. 4 illustrates charging at stage II while stages III and IV indicate discharging.

Figure 5:
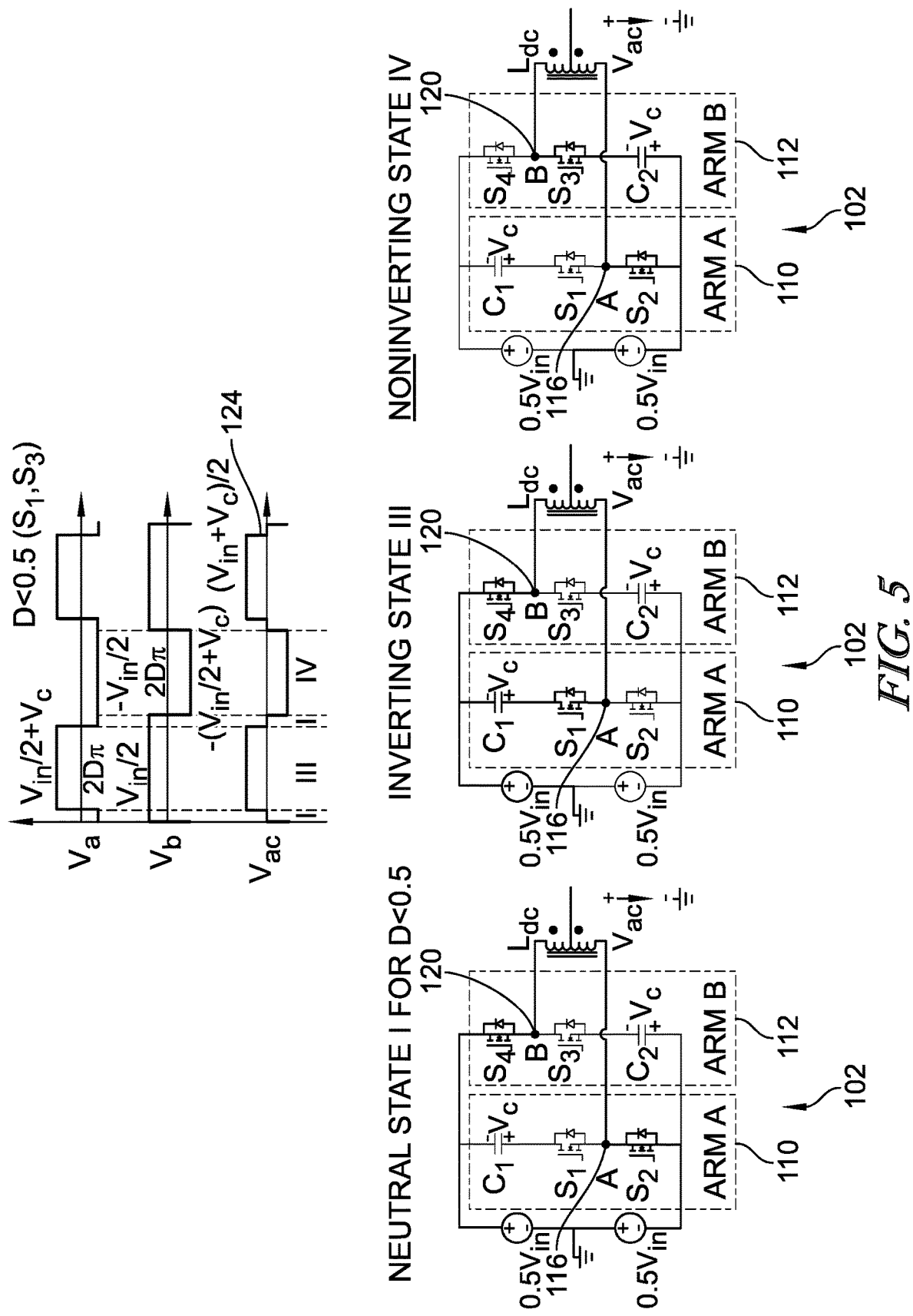
FIG. 5 is a chart representing a common mode output for a duty cycle of less than 50% and circuit diagrams representing varying outputs of the common mode.
Figure 6:
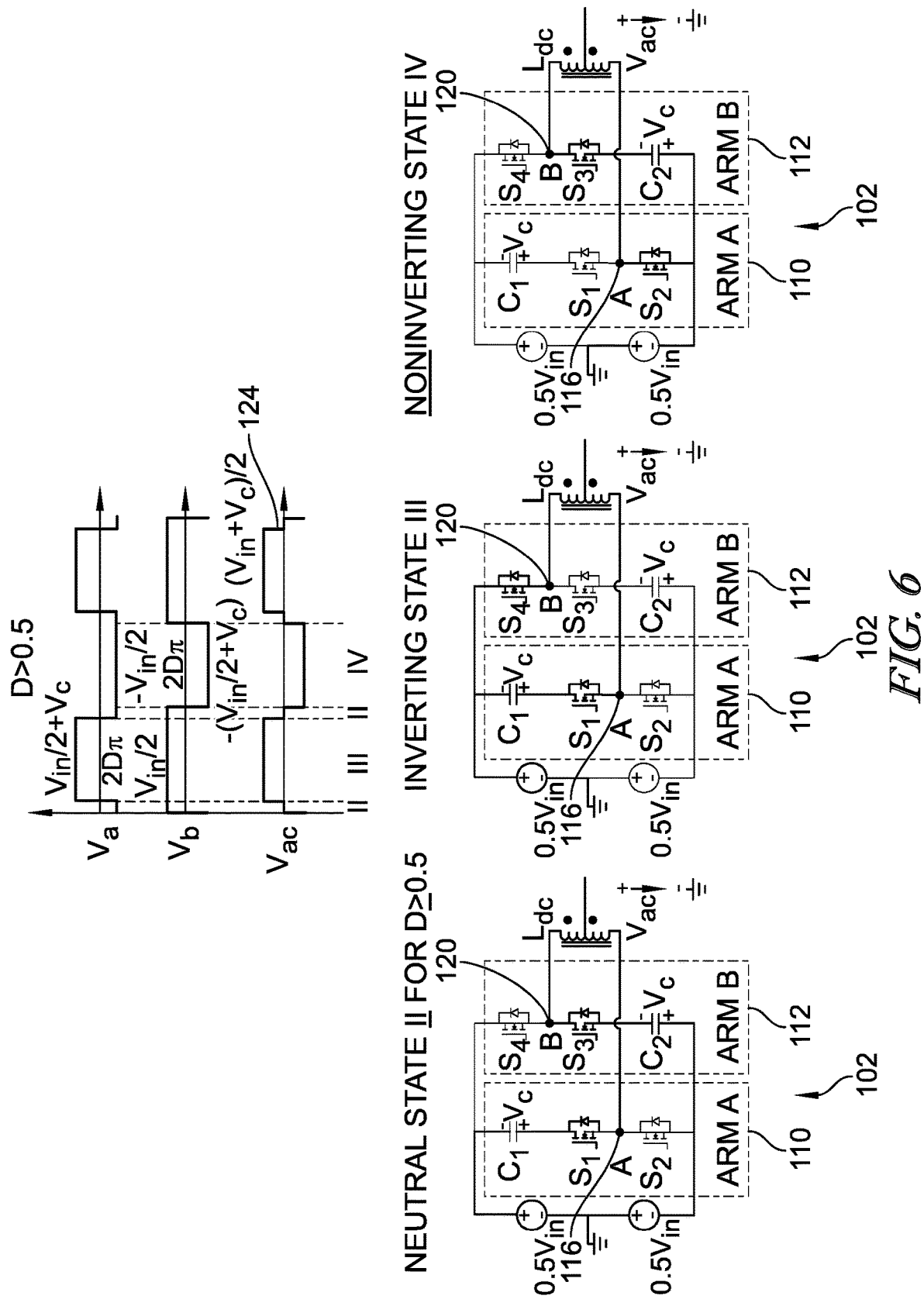
FIG. 6 is a chart representing a common mode output for a duty cycle of greater than 50% and circuit diagrams representing varying outputs of the common mode.

FIGS. 5 and 6 further illustrate integration of the buck-boost circuit 102 by the interleaved arms 110, 112 according to a common-mode gain of the converter 100 (i.e., amplification of voltages present on both of the arms 110, 112 relative to the common/ground). In FIG. 5, the neutral state, with the duty cycle D being less than 50%, is shown as activating the second switch S2 and the fourth switch S4. While in FIG. 6, the neutral state when the duty cycle D is greater than 50% activates the first capacitor C1 and the first switch S1 of the first arm 110 in correspondence with the second capacitor C2 and the third switch S3 of the second arm 112.

FIGS. 5 and 6 diagram the same topologies for the inverting and noninverting states, stages III and IV respectively, whether the duty cycle D is less or greater than 50%. The voltage diagrams of FIGS. 5 and 6 indicate changing between neutral, inverting, and noninverting stages during the progression of the duty cycle D. In FIG. 5, stage I indicates a neutral state while stages III and IV indicate inverting and noninverting states, respectively. Further, in the diagram of FIG. 6, the neutral state is II and the inverting and noninverting states correspond to stages III and IV.

Figure 7:
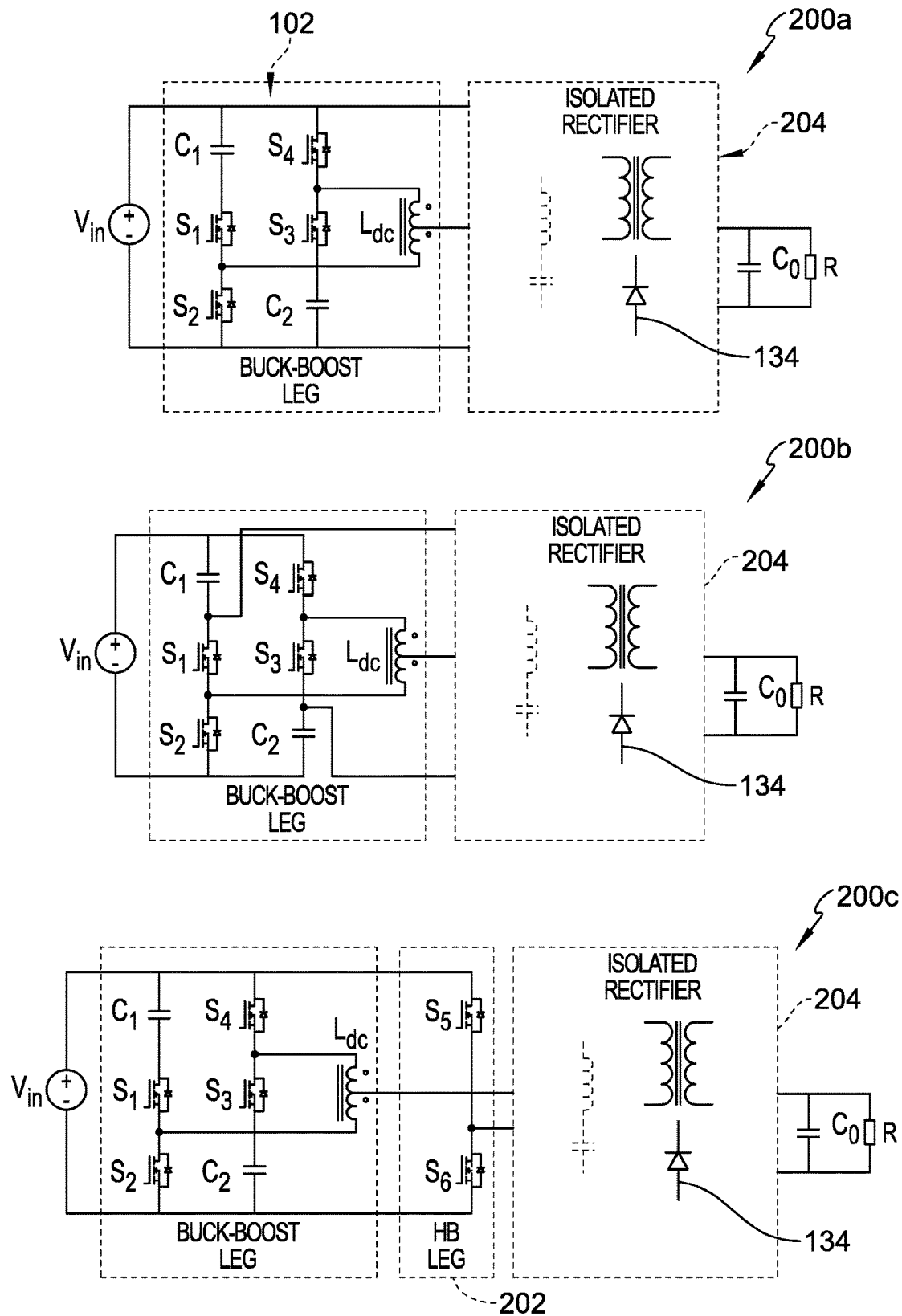
FIG. 7 illustrates several schematic circuit diagrams of the single-stage converter with modified buck-boost circuit arrangements.
Figure 7:
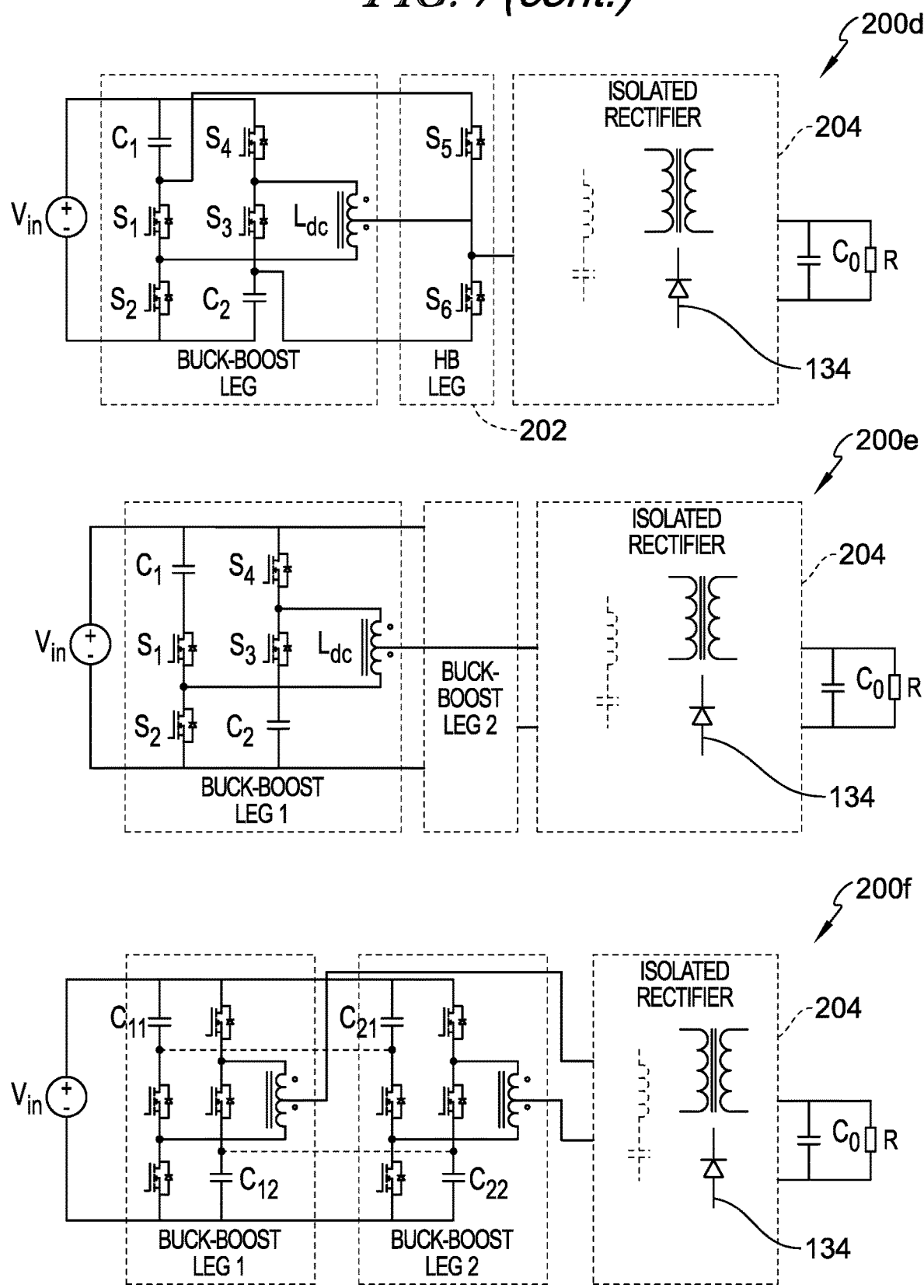
Figure 8:
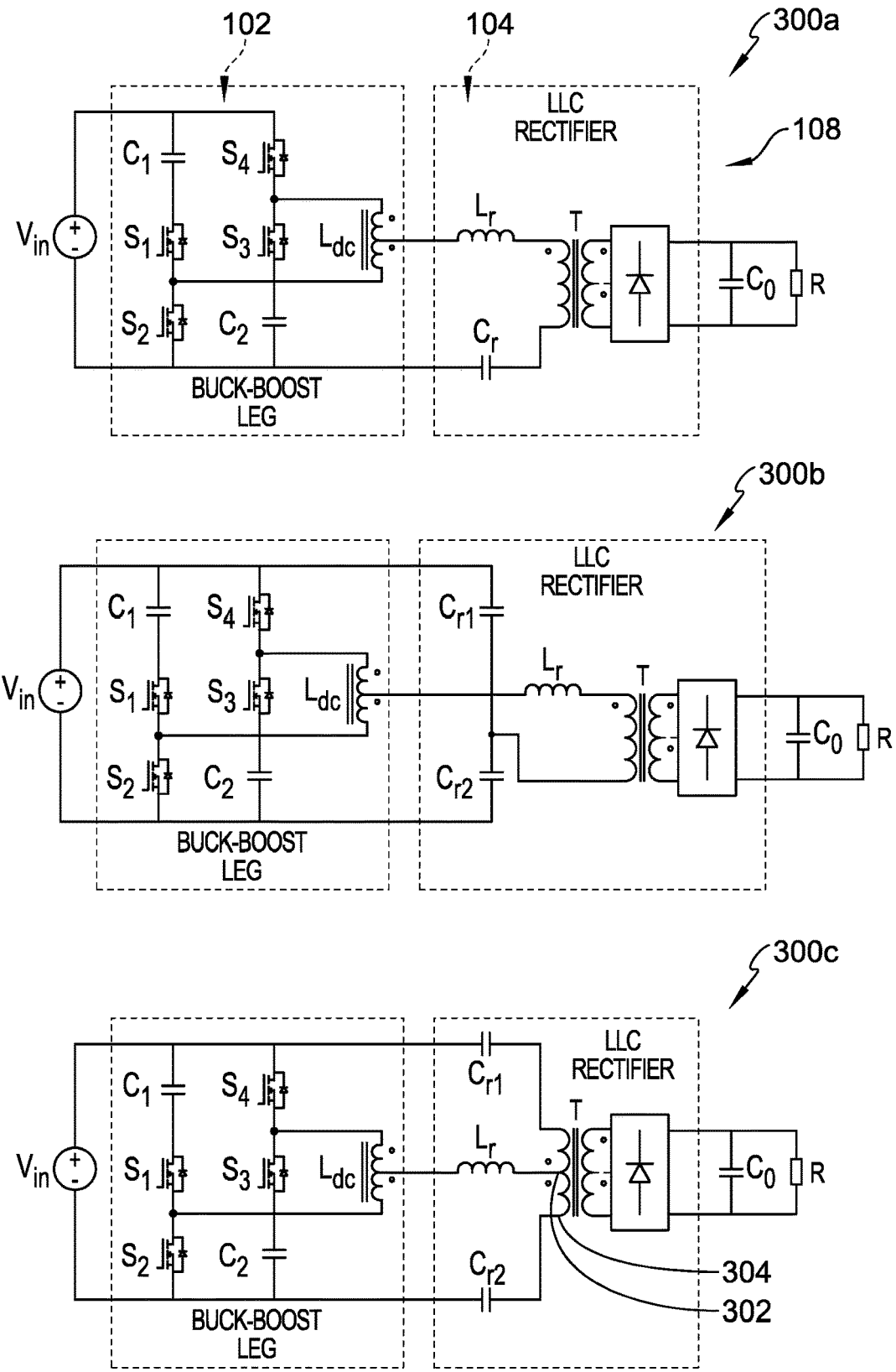
FIG. 8 illustrates several schematic circuit diagrams of the single-stage converter with modified rectifier circuit arrangements.

Referring now to FIGS. 7 and 8, several embodiments and variations of the single-stage converter 100 are illustrated. In FIG. 7, half-bridge type DC-DC converters 200a, 200b are diagrammed each with the single buck-boost circuit 102. Also, in FIG. 7, single-phase DC-DC converters 200c, 200d are shown with the half-bridge buck-boost circuit 102 in combination with a hybrid buck-boost phase circuit 202 comprising fifth and sixth switches S5, S6. The diagrams of (e) and (f) in FIG. 7 are single-phase or multiphase DC-DC converters 200e, 200f with two (or, in example embodiments, a plurality) of the buck-boost phase circuits 102. In the example circuit configurations 200e, 200f, the capacitors in each of the buck-boost phase circuits 102 may be disposed either separately or in parallel. Each of the circuit configurations 200a-200f of FIG. 7 further comprise an isolated rectifier circuit 204. The isolated rectifier circuit 204 may be one of the LLC resonant converters/circuit 104 or another suitable non-resonant converter (e.g., full-bridge phase shift converter, dual-active-bridge converter, etc.).

In FIG. 8, example circuit configurations comprising the buck-boost circuit 102 are combined with half-bridge LLC converters. The circuit configuration of 300a is the single-stage converter 100 in the half-bridge LLC converter configuration 108 (see also FIG. 1). Further, a circuit configuration 300b includes first and second resonant capacitors $C_{r1}$, $C_{r2}$ operatively coupled in parallel with one end of the transformer T. This adds an additional capacitor as compared with the resonant capacitor $C_r$ of the LLC resonant circuit 104 illustrated in FIG. 1. In a circuit configuration 300c, the first and second resonant capacitors $C_{r1}$, $C_{r2}$ are operatively coupled to either end of the transformer T while the resonant inductor $L_r$ is operatively coupled to a center tap 302 of a primary winding 304 of the transformer T.

The embodiment(s) detailed above may be combined, in full or in part, with any alternative embodiment(s) described.

INDUSTRIAL APPLICABILITY

The above disclosure may represent an improvement in the art by providing a reliable, efficient, and economical single-stage, wide-gain converter. Compared to prior art two-stage converters with similar voltage range capabilities, the subject matter of the instant disclosure offers greater power density and straightforward control. The single-stage converter may allow for a wide-gain range with fewer and smaller electrical components.

While some implementations have been illustrated and described, numerous modifications come to mind without significantly departing from the spirit of the disclosure, and the scope of protection is only limited by the scope of the accompanying claims.

To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein.

It should be understood that the described instructions, operations, and systems can generally be integrated together in a single software/hardware product or packaged into multiple software/hardware products.

The use of the terms "a" and "an" and "the" and "said" and similar references in the context of describing the subject matter of the present disclosure (especially in the context of the following claims) are to be construed to cover both the singular and the plural, unless otherwise indicated herein or clearly contradicted by context. An element proceeded by "a," "an," "the," or "said" does not, without further constraints, preclude the existence of additional same elements. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

The invention claimed is:

1. A single-stage converter comprising:
   a rectifying circuit; and
   a buck-boost circuit comprising:
      an inductor including a center tap configured to supply an output of the buck-boost circuit to the rectifying circuit; and
      first and second interleaved arms arranged in parallel with a voltage input of the single-stage converter and each being coupled to the inductor, the first and second interleaved arms comprising a plurality of switches operable to control the output of the buck-boost circuit;
   wherein the plurality of switches comprises (i) first and second switches disposed in the first interleaved arm and (ii) third and fourth switches disposed in the second interleaved arm; and
   wherein the first interleaved arm includes a first capacitor disposed in series with the first and second switches, and wherein the second interleaved arm includes a second capacitor disposed in series with the third and fourth switches.

2. The single-stage converter of claim 1, wherein a first node disposed between the first and second switches couples the first interleaved arm to the inductor.

3. The single-stage converter of claim 2, wherein a second node disposed between the third and fourth switches couples the second interleaved arm to the inductor.

4. The single-stage converter of claim 1, wherein the rectifying circuit comprises a tank resonator.

5. The single-stage converter of claim 4, wherein the rectifying circuit further comprises at least one of a rectifying diode and a synchronous rectifier.

6. The single-stage converter of claim 4, wherein the rectifying circuit further comprises at least one rectifying diode operatively coupled to a filtering output capacitor.

7. The single-stage converter of claim 1, configured to apply one of pulse width modulation and frequency modulation to the plurality of switches to control a voltage gain developed by the single-stage converter.

8. The single-stage converter of claim 1, configured to apply zero-voltage switching to the plurality of switches.

9. A method of operating a converter, the method comprising:
   operating a plurality of switches disposed in first and second interleaved arms of the converter to generate an AC voltage in an inductor of the converter that is coupled to the first and second interleaved arms;
   supplying the AC voltage to an LLC resonant circuit of the converter from a center tap output of the inductor, the inductor being configured in parallel with a resonant capacitor of the LLC resonant circuit; and
   rectifying the AC voltage with the LLC resonant circuit of the converter and at least one diode of the converter.

10. The method of claim 9, wherein operating the plurality of switches comprises zero-voltage switching of the plurality of switches.

11. The method of claim 9, wherein operating the plurality of switches comprises controlling switching of the plurality of switches using pulse width modulation.

12. The method of claim 9, wherein operating the plurality of switches comprises controlling switching of the plurality of switches using frequency modulation.

13. The method of claim 9, wherein supplying the AC voltage to the LLC resonant circuit comprises supplying the AC voltage to an inductor of the LLC resonant circuit.

* * * * *